United States Patent
Cariou et al.

(10) Patent No.: US 12,160,830 B2
(45) Date of Patent: Dec. 3, 2024

(54) INITIAL POWER STATE AFTER TRAFFIC IDENTIFIER MAPPING FUNCTION

(71) Applicant: Intel Corporation, Santa Clara, CA (US)

(72) Inventors: Laurent Cariou, Portland, OR (US); Po-Kai Huang, San Jose, CA (US); Alexander Min, Portland, OR (US); Minyoung Park, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/319,766

(22) Filed: May 18, 2023

(65) Prior Publication Data

US 2023/0292245 A1 Sep. 14, 2023

Related U.S. Application Data

(63) Continuation of application No. 17/092,146, filed on Nov. 6, 2020, now abandoned.

(60) Provisional application No. 62/931,639, filed on Nov. 6, 2019.

(51) Int. Cl.
*H04W 52/02* (2009.01)

(52) U.S. Cl.
CPC ... *H04W 52/0251* (2013.01); *H04W 52/0206* (2013.01); *H04W 52/0212* (2013.01); *H04W 52/0225* (2013.01)

(58) Field of Classification Search
CPC ........ G01S 13/765; G01S 5/0205; G01S 5/10; G01S 1/20; G01S 11/06; G01S 13/75; G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 52/0206; H04W 52/0212; H04W 52/0225; H04W 52/0251; H04W 52/0229; H04W 84/12; H04W 88/06; H04W 52/02; H04L 43/106; H04B 17/27

See application file for complete search history.

(56) References Cited

U.S. PATENT DOCUMENTS

| | | | |
|---|---|---|---|
| 11,510,269 B2* | 11/2022 | Asterjadhi | H04L 69/14 |
| 11,800,410 B1* | 10/2023 | Li | H04W 74/0808 |
| 2018/0092039 A1* | 3/2018 | Cariou | H04W 52/34 |
| 2020/0396568 A1* | 12/2020 | Huang | H04W 76/40 |
| 2021/0007168 A1* | 1/2021 | Asterjadhi | H04W 52/0216 |
| 2021/0014776 A1* | 1/2021 | Patil | H04W 48/08 |

(Continued)

*Primary Examiner* — Nathan S Taylor
(74) *Attorney, Agent, or Firm* — Eversheds Sutherland (US) LLP

(57) ABSTRACT

This disclosure describes systems, methods, and devices related to initial power state. A device may identify a request frame received from a non-AP MLD on a first link of a plurality of links, wherein the non-AP MLD comprises a plurality of station devices (STAs), and wherein the first link is associated with a first STA of the plurality of STAs. The device may cause to send a response frame to the non-AP MLD on the first link to establish the plurality of links between the device and the non-AP MLD. The device may determine, based on the request frame, a power save mode associated with each of the STAs of the non-AP MLD. The device may communicate with the non-AP MLD based on the power save mode.

20 Claims, 10 Drawing Sheets

(56) References Cited

U.S. PATENT DOCUMENTS

| | | | |
|---|---|---|---|
| 2021/0029588 A1* | 1/2021 | Cariou | H04W 28/0263 |
| 2021/0037583 A1* | 2/2021 | Seok | H04W 76/15 |
| 2021/0045095 A1* | 2/2021 | Cariou | H04W 76/15 |
| 2021/0045175 A1* | 2/2021 | Huang | H04L 5/0055 |
| 2021/0084711 A1* | 3/2021 | Park | H04W 72/0453 |
| 2021/0282229 A1* | 9/2021 | Stacey | H04W 88/10 |
| 2021/0337475 A1* | 10/2021 | Cariou | H04L 5/0098 |
| 2021/0400662 A1* | 12/2021 | Huang | H04W 72/542 |
| 2022/0201785 A1* | 6/2022 | Kneckt | H04W 12/04 |
| 2022/0312522 A1* | 9/2022 | Jang | H04W 76/15 |
| 2022/0346176 A1* | 10/2022 | Jang | H04W 84/12 |
| 2023/0328774 A1* | 10/2023 | Jang | H04W 74/04 370/329 |

* cited by examiner

INITIAL POWER STATE AFTER TRAFFIC IDENTIFIER MAPPING FUNCTION

CROSS-REFERENCE TO RELATED APPLICATION(S)

This application is a continuation of U.S. Non-Provisional application Ser. No. 17/092,146, filed Nov. 6, 2020, which claims the benefit of U.S. Provisional Application No. 62/931,639, filed Nov. 6, 2019, both disclosures which are hereby incorporated herein by reference in its entirety.

TECHNICAL FIELD

This disclosure generally relates to systems and methods for wireless communications and, more particularly, to initial power state after traffic identifier (TID) mapping function.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
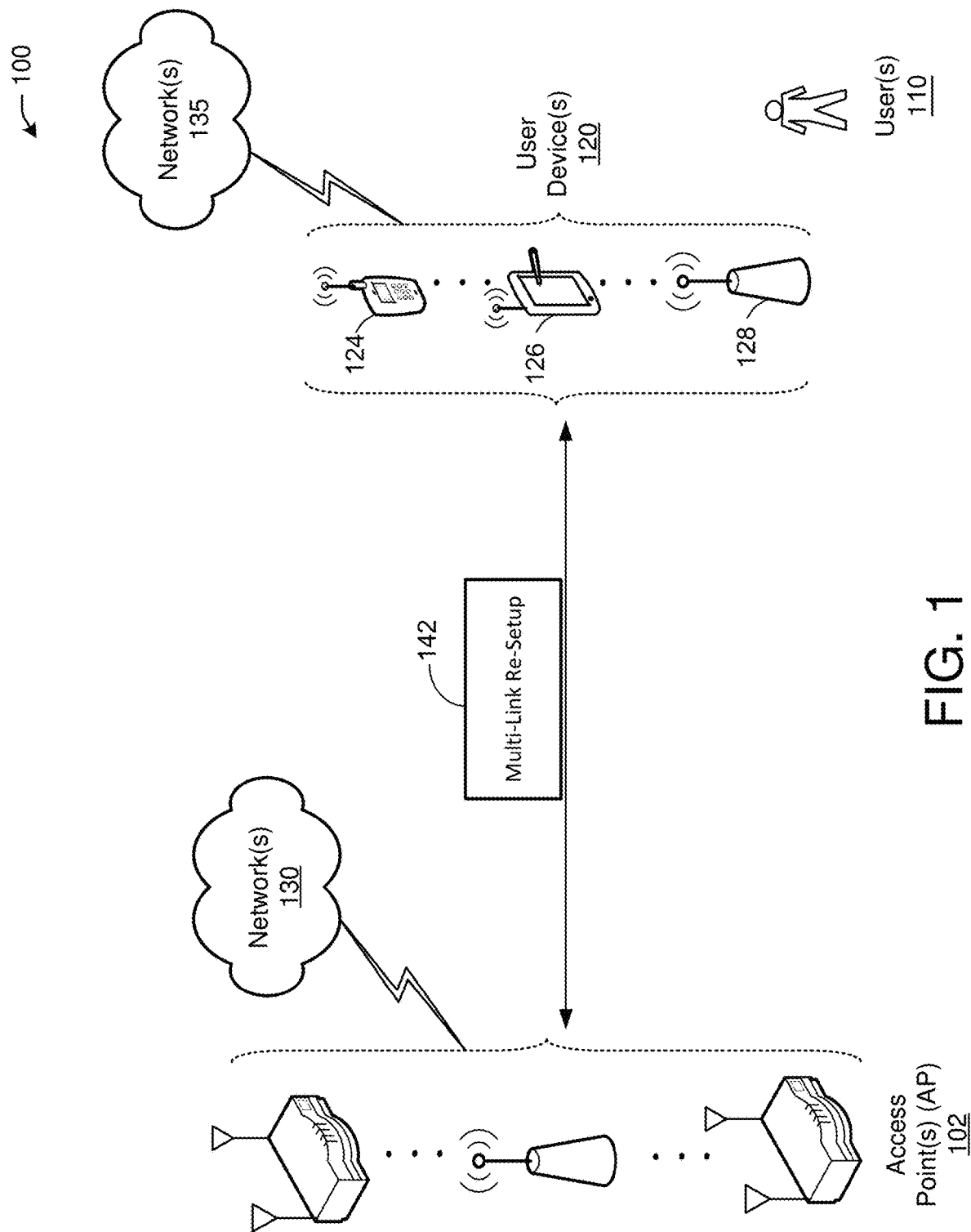
FIG. 1 is a network diagram illustrating an example network environment for multi-link re-setup, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Existing wireless device communication, referred to herein as legacy operation, may include a singular link operation (i.e., a one-link operation) between an access point (AP) and a non-AP, where association request/response is used for the single link setup between the AP, such as a router operating in a home network, and the non-AP, such as a device such as a tablet computer or mobile device. With conventional wireless device systems, when connecting to an upper layer distributed system medium (DSM) (e.g., the Internet), the router or other upper layer AP device may see any connected non-AP device as a single address point. When the DSM is connecting to the lower layer device, the upper layer also views the lower layer device as a singular object and passes the data through that single AP. Legacy systems may set up this singular link during the association phase (also referred to herein as the setup phase) of the connection.

Existing one-link operation also has the functionality of reassociation, where the mapping of routing through the DSM to the non-AP is changed to another AP or the current setting, where the existing AP is reset. Existing one-link operation may also include disassociation, where the existing mapping to DSM is deleted. However, existing one-link operation does not provide for simultaneous multiple links through a singular AP, such that the upper layer may connect to the lower layer through the singular access point. Conventional one-link systems do not have ability to connect to multiple connections simultaneously to a lower layer device. Moreover, conventional one-link systems do not indicate initial power states of multiple connections after a traffic identifier (TID) mapping function.

Example embodiments of the present disclosure relate to systems, methods, and devices for multi-link operation using a multi-level device (MLD).

An MLD, also referred to as a multi-link logical entity (MLLE), is a logical entity that contains one or more STAs. The logical entity has one MAC data service interface and primitives to the logical link control (LLC) and a single address associated with the interface, which may be used to communicate on the DSM. The MLD may allow STAs within the MLD to have the same MAC address. In one example embodiment, the MLD may connect the DSM to pass the data through a specific point that appears as a singular object from the perspective of the DSM. Scheduling may be local to the AP router (e.g., the AP-MLD), where traffic is sent to the AP-MLD between the non-AP MLD and the AP MLD. The MLDs perform scheduling decisions based on local hardware conditions and capabilities. The links can be setup by a two-way handshake called MLD association (also referred to herein as MLD setup) request/response among two MLDs.

The MLD association/setup may include three general steps that may facilitate operation on a link with a multi-link framework:

In one or more embodiments, in a Step 1: Executing the MLD setup signaling exchange over one link initiated by a non-AP MLD with an AP MLD. This step may include exchanging capability information for one or more bidirectional links during the MLD setup. The AP-MLD serves as the interface to the distribution system (DS) for the multi-link non-AP logical entity after successful multi-link setup. Responsive to completion of Step 1, at least one of the links is setup.

In one or more embodiments, a Step 2: Defining a mechanism to determine, during or after successful completion of MLD setup, and enabling respective bidirectional link(s) is(are) for class 2 and class 3 frame exchange after multi-link setup. This may include enabling the bidirectional links under the TID-link mapping function, which enables mapping of all TIDs to a set of setup links. This means a link may be disabled or enabled. An enabled link has a TID that has mapped to at least one link it is enabled. If no TIDs are mapped to a link, the link is disabled. At any point in time, a TID shall always be mapped to at least one link that is set up. The TID to link mapping can be updated after multi-link setup through a negotiation, which can be initiated by any MLD.

A link may be enabled when that link becomes usable to exchange frames subject to STA power states, and when at least one TID is mapped to that link. An initial state is associated to that link once it is enabled. When the link becomes enabled, which may be through classic setup/association, or setup/association via TID to link mapping update, the system may transition a link from a disabled state to an enabled state, or from a disabled state to an enabled state. When a link is disabled (i.e. not enabled) by an MLD, the frame exchanges are not possible and TID are not mapped to that link.

Step 3: Define power states per link.

Frame exchange can be performed on each of the enabled links only if the STA is in awake state, and not if it is in doze state. The system may follow power management protocols to allow state transitions that are controlled by the STA, or negotiated and planned ahead between an AP and a STA (such target wake time (TWT) for instance).

When step 2 is completed, the MLD STA and AP MLD can operate and exchange frames on each enabled links when the STA is in awake state. There are 2 ways for a link to be enabled:

In a first method, the link(s) may be enabled through an MLD setup/association phase, which may incorporate signal(s) for link mapping, or not incorporate signal(s) for link mapping (in which case, default mapping: all TIDs mapped to all setup links applies).

In a second method, the link may be enabled through a TID-link mapping update negotiation, after multi-link setup.

For both cases, there is a need to define an initial power state of the STA of a non-AP MLLE, when the link on which that STA operates gets enabled. Conventional methods do not provide definitions for initial power states for multi-link devices after the setup/association of those devices.

Example embodiments of the present disclosure relate to systems, methods, and devices for setting an initial power state.

According to one embodiment, an initial power state system may facilitate implicit rules that determine the initial power state of the STA of a link that gets enabled, based on the link that has been used to enable the link.

In one or more embodiments, an initial power state system may facilitate that when a link becomes enabled for a STA that is part of a non-AP MLD through multi-link setup/association sent on that link, the initial power management mode of the STA, immediately after the signaling exchange, is set to active mode.

In one or more embodiments, an initial power state system may facilitate that when a link is enabled for a STA that is part of a non-AP MLD through signaling (multi-link setup/association or TID to link mapping update) the system may send, on another link, the initial power management mode of the STA. The MLD system may send the initial power management mode of the STA immediately after the exchange, when the link is in a power save mode, and its power state is in a doze state. It should be understood that a power management (PM) bit may be set in a frame to indicate whether a device is in an active mode or in a power save mode. For example if PM bit is set to 0, it indicates that the device is always awake (awake state). However, if the PM bit is set to 1, this indicates that the device is in a power save mode. The power save mode may be awake state or doze state. Therefore, it is important to determine what state a device is in order to be able to communicate with that device. It should be understood that a device may be one of the logical devices (STAs) within a non-AP MLD.

In one or more embodiments, an initial power state system may setup/associate 2 links (link 1 and 2) between an AP MLD and a non-AP MLD, and apply default mapping where all links are enabled by the multi-link setup/association phase. The initial power state system may exchange setup frames on link 1. At the end of multi-link setup, the initial power management mode and state of the STAs (of the non-AP MLD) operating on link 1 and 2 are as follows:
The STA 1 operating on link 1 is in an active mode (awake state); and
The STA 2 operating on link 2: power save mode (in this case, doze state).

In a second embodiment, the initial power state system may setup/associate setup 2 links (e.g., link 1 and 2) between an AP MLLE and a non-AP MLLE, but only one link (link 1) is enabled. After some time of operating on link 1, AP MLLE and STA MLLE may exchange a TID-link mapping update to enable link 2. At the end of the TID-mapping update, the initial power management mode and state of the STA of the non-AP MLLE operating on link 2 is as follows: The STA 2 operating on link 2 is in power save mode (in this case, doze state).

In one or more embodiments, an initial power state system may facilitate an initial power state that the non-AP MLD can indicate, during the multi-link setup phase and during the TID-link mapping update negotiation, where the initial power management mode and power state of the STA operating on the link that will become enables right after the successful completion of the multi-link setup or TID-link mapping update.

In one embodiment, the initial power state system may enable the link in the MLD link setup request or response sent by the non-AP MLD, where the non-AP MLD designates a field, for each link that is part of the setup that indicates an initial power state for the STA upon successful completion of the multi-link setup/association.

The initial power state system may enable the link in the TID-link mapping update request or response sent by the non-AP MLD, using a field for each link that is part of the TID-mapping update that indicates the initial power state that the STA intends to be on upon successful update of TID-link mapping, and indicates whether a link was previously disabled and has become enabled by the TID-link mapping function.

In another example embodiment, the initial power state system may set up two links (e.g., links 1 and 2) between an AP MLD and a non-AP MLD, and apply a default mapping where all links are enabled by the MLD setup/association phase. The initial power state system may exchange MLD setup frames on link 1, and send an MLD setup request frame (or association request frame) by the non-AP MLD to include an initial power state field in the element describing link the element may also describe link 2. In one aspect, the initial power state field of link 1 is set to "active mode," and the initial power state field of link 2 is set to "active mode." At the end of multi-link setup/association, the initial power management mode and state of the STAs (of the non-AP MLD) operating on link 1 and 2 are as follows:

The STA 1 operating on link 1 may be set to an active mode (awake state); and

The STA 2 operating on link 2 may be set to the active mode (awake state).

In a second example, the links may be set up by multi-link setup (link 1 and 2) between an AP MLD and a non-AP MLD, and default mapping may be applied where all links are enabled by the multi-link setup/association phase. Multi-link setup frames are exchanged on link 1, and multi-link setup request frame (or association request frame) sent by the non-AP MLD may include an "initial power state" field in the element describing link 1 and, in the element, describing link 2. The initial power state field of link 1 may be set to "active mode", and the initial power state field of link 2 may be set to a power save mode (in this case, doze state). According to the second example embodiment, at the end of multi-link setup/association the initial power management mode and state of the STAs (of the non-AP MLD) operating on link 1 and 2 are as follows:

The STA 1 operating on link 1 is set to the active mode (awake state); and

The STA 2 operating on link 2 is set to the power save mode (in this case, doze state).

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of initial power state, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 5:
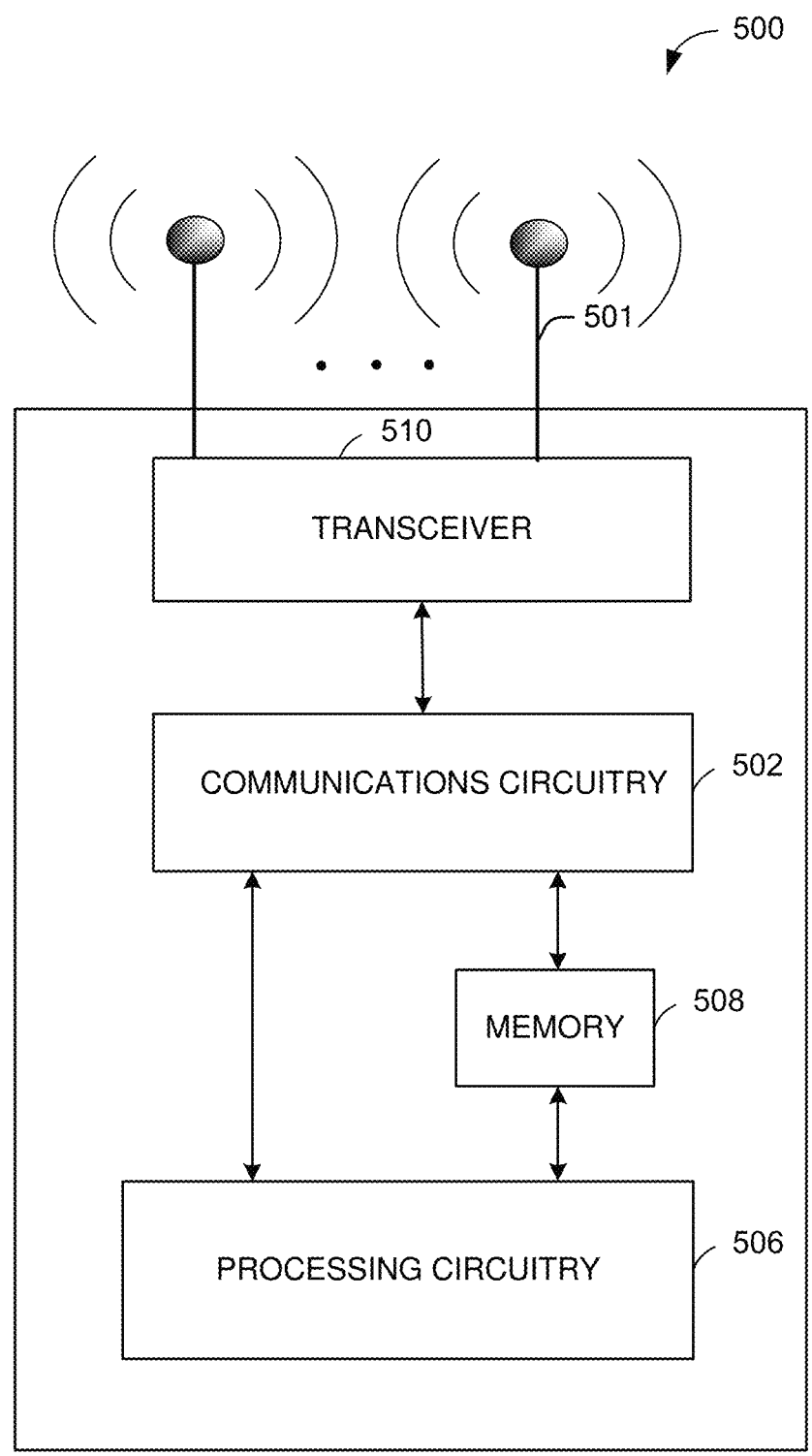
FIG. 5 illustrates a functional diagram of an exemplary communication station that may be suitable for use as a user device, in accordance with one or more example embodiments of the present disclosure.
Figure 6:
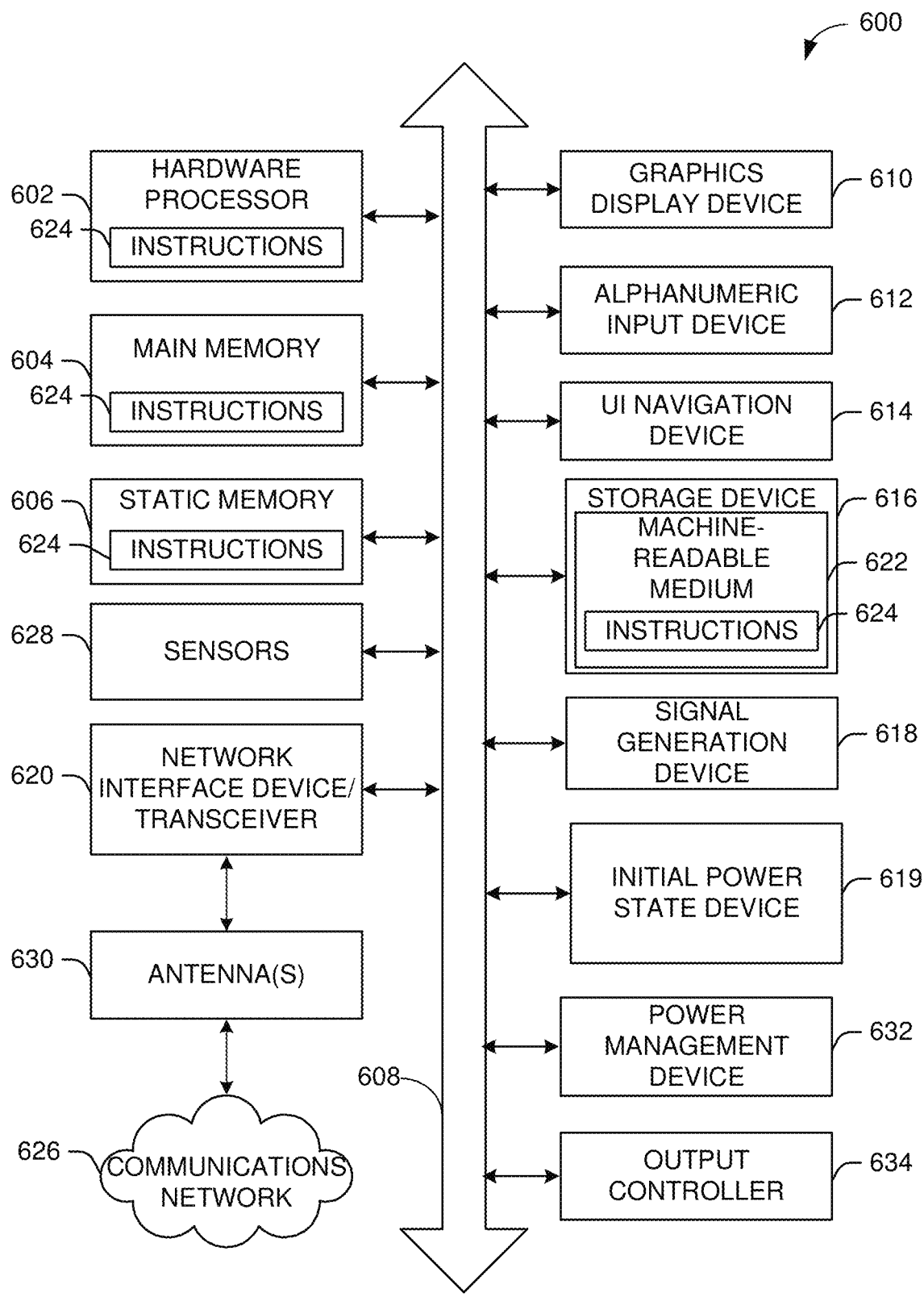
FIG. 6 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internetaccessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate initial power state 142 with one or more user devices 120.

According to one embodiment, the initial power state 142 may facilitate implicit rules that determine the initial power state of the STA of a link that gets enabled, based on the link that has been used to enable the link. The STA may be one STA of the plurality of STAs in a non-AP MLD (e.g., any of the user devices 120).

In one or more embodiments, the initial power state 142 may facilitate that when a link becomes enabled for a STA that is part of a non-AP MLD (e.g., any of the user devices 120). through multi-link setup/association sent on that link, the initial power management mode of the STA, immediately after the signaling exchange, is set to active mode.

In one or more embodiments, the initial power state 142 may facilitate that when a link is enabled for a STA that is part of a non-AP MLD through signaling (multi-link setup/association or TID to link mapping update) the system may send, on another link, the initial power management mode of the STA. The MLD system may send the initial power management mode of the STA immediately after the exchange, when the link is in a power save mode, and its power state is in a doze state. It should be understood that a power management (PM) bit may be set in a frame to indicate whether a device is in an active mode or in a power save mode. For example if PM bit is set to 0, it indicates that the device is always awake (awake state). However, if the PM bit is set to 1, this indicates that the device is in a power save mode. The power save mode may be awake state or doze state. Therefore, it is important to determine what state a device is in order to be able to communicate with that device. It should be understood that a device may be one of the logical devices (STAs) within a non-AP MLD.

It is understood that the above descriptions are for purposes of illustration and are not meant to be limiting.

Figure 2:
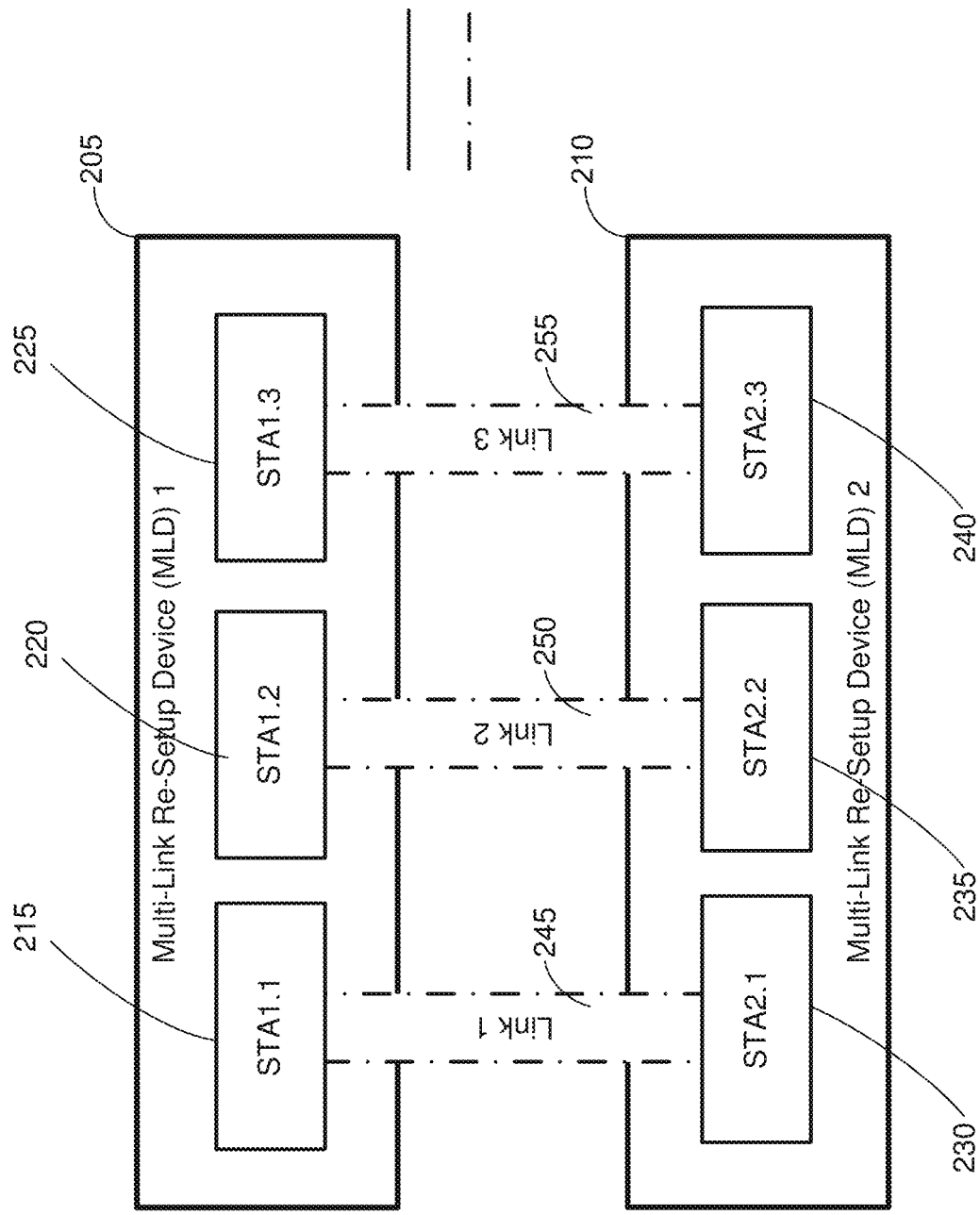
FIG. 2 depicts an illustrative schematic diagram for a multi-link device (MLD) between two logical entities, in accordance with one or more example embodiments of the present disclosure.

FIG. 2 depicts an illustrative schematic diagram for initial power state, in accordance with one or more example embodiments of the present disclosure.

Referring to FIG. 2, there are shown two MLDs that include a MLD 1 205 and a MLD 2 210. The MLD1 205 is shown across from the MLD 210, where the MLD 205 connects wirelessly with the MLD2 210 through a plurality of wireless DS links 245, 250, and 255. The MLD1 205 is depicted in FIG. 2 to include multiple STAs such as a STA1.1 215, a STA1.2 220, and a STA1.3 225 that can set up links with each other. The MLDs 1 and 2 (205 and 210, respectively) may be logical entities that respectively contain one or more STAs. A logical entity has one MAC data service interface and primitives to the logical link control (LLC), and a single address associated with the interface, which can be used to communicate on the distribution system medium (DSM). It should be noted that a Multi-link logical entity allows STAs within the multi-link logical entity to have the same MAC address. It should also be noted that the exact name can be changed. Although three STAs are shown as part of the MLD1 205 and MLD2 210, respectively, it should be appreciated that as few as one STA, and/or many more than three STAs may be included as logical entities associated with the MLD1 205 and/or MLD2 210.

In the example of FIG. 2, the MLD1 205 and MLD2 210 are two separate physical devices, where each one comprises any number of virtual or logical devices. For example, the MLD1 205 may include one, two, three or more STAs, including for example, a STA1.1 215, a STA1.2 220, and a STA1.3 225. The MLD 210 may include three STAs, including a STA2.1 230, a STA2.2 235, and a STA2.3 240. The example shows that the logical device STA1.1 215 is communicating with the logical device STA2.1 230 over the link 1 245, that logical device STA1.2 220 is communicating with the logical device STA2.2 235 over the link 2 250, and the device STA1.3 225 is communicating with the logical device STA2.3 240 over the link 3 255. Although three STAs are shown as part of the MLDs 1 and 2, respectively, it should be appreciated that as few as one STA, and/or many more than three STAs may be included as logical entities associated with the MLD 205 and/or MLD 210.

Figure 3:
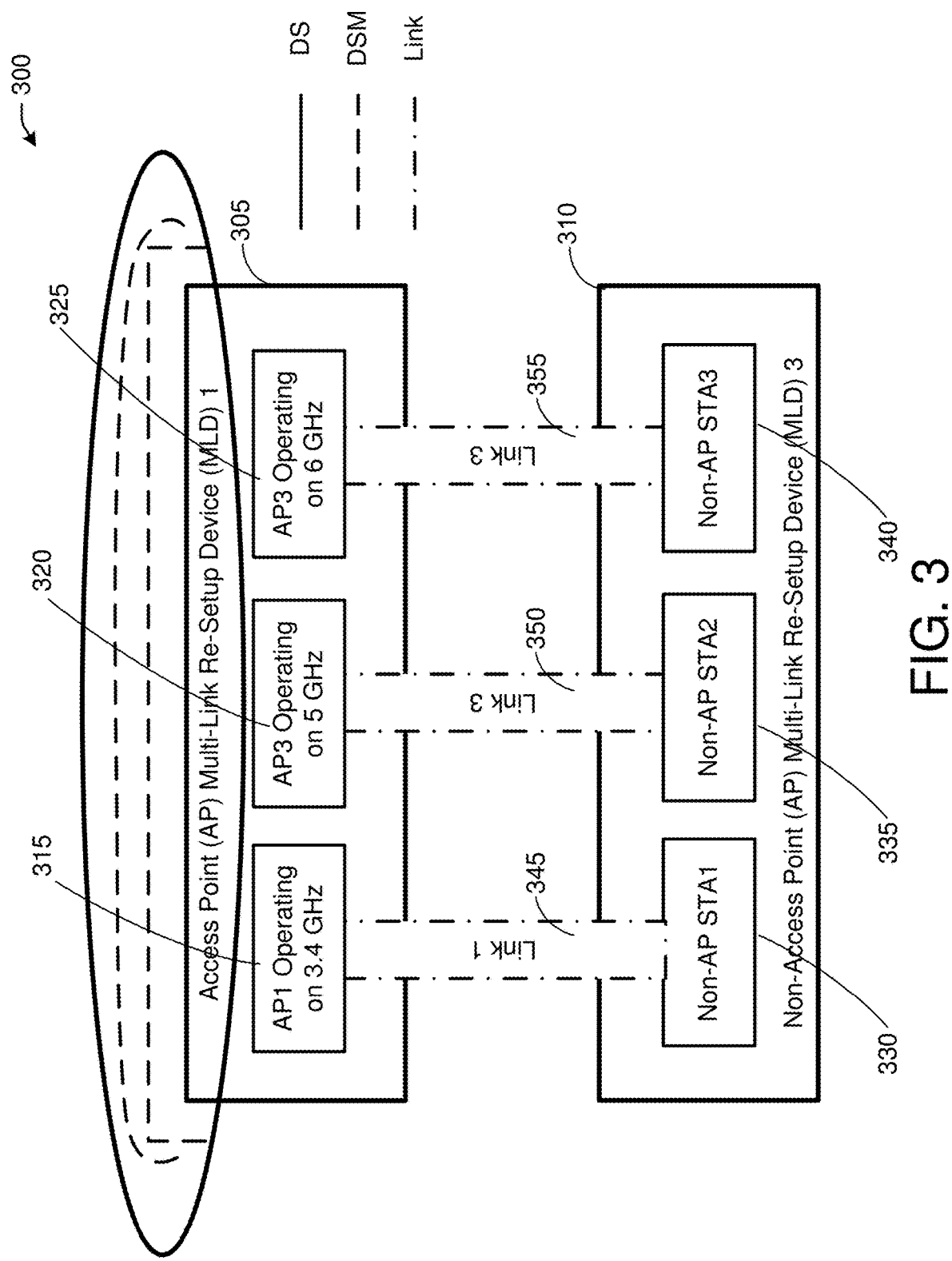
FIG. 3 depicts an illustrative schematic diagram for a multi-link device (MLD) between AP with logical entities and a non-AP with logical entities, in accordance with one or more example embodiments of the present disclosure.

FIG. 3 depicts an illustrative schematic diagram for an initial power state system 300 comprising access point (AP) multi-link devices (MLDs) communicating wirelessly with non-AP MLDs, in accordance with one or more example embodiments of the present disclosure.

Referring to FIG. 3, there are shown two MLDs including an AP MLD1 305 and a non-AP MLD2 310 depicted on either side of a plurality of links 345, 350, and 355, respectively. The MLD1 305 and the MLD3 310 may include multiple STAs configured for setting up links with each other. For infrastructure framework, the AP MLD1 305 may include a plurality of APs (e.g., AP1 315, AP2 320, and AP3 325) on one side. On the other side of the wireless links 345, 350 and 355, respectively, a non-AP MLD3 310 may also include a plurality of non-AP STAs (e.g., a non-AP STA1 330, a non-AP STA2 335, and a non-AP STA3 340).

According to an embodiment of the present disclosure, the initial power state system 300 may include a mechanism for determining a number of active STAs 330, 335, and 340, etc., and a number of connected links 345, 350, 355, etc., that will connect with the APs, and a mechanism for setting up the non-AP MLD (e.g., a set of the STAs 330-340) by associating the STAs to the AP MLD1 305. Therefore, the STAs 330-340 and the AP MLD1 305 may operate and exchange frames on each of the enabled links 345-355 when a respective STA is in the awake state.

As introduced above, there are two ways for a link to be enabled. In the first of the two methods for enabling a link, a multi-link setup phase (equivalent to multi-link association), may incorporate one or more signal(s) for link mapping. In another aspect, the multi-link setup phase may not incorporate any signals for link mapping. In the second case, a default mapping may be included, where all TIDs mapped to all setup links applies. In some embodiments, setup may include multi-link association.

A second way for a link to be enabled may include enabling the link through a TID-link mapping update negotiation, which may occur after multi-link setup.

An MLD association/setup may include three general steps that can facilitate operation on a link with a multi-link framework:

A first step may include executing MLD setup signaling exchange over one link (e.g., the link 345 (depicted in FIG. 3 as Link 1) initiated by a non-AP MLD (e.g., the non-AP MLD3 310) with an AP MLD (e.g., the AP MLD1 305). This step may include exchanging capability information for one or more bidirectional links such as the links 345, 350, and/or 355, during the MLD setup. The AP MLD1 305 serves as the interface to the distribution system (DS) for the multi-link non-AP logical entity after successful multi-link setup. Responsive to completion of Step 1, at least one of the links 345-355 may be setup.

A second step may include defining a mechanism to determine, during or after successful completion of MLD setup, which of the links 345-355 may be enabled for class 2 and/or class 3 frame exchange, and enabling respective bidirectional link(s) is(are) for class 2 and class 3 frame exchange after the multi-link setup. This may include enabling the bidirectional links 345-355 under the TID-link mapping function, which enables mapping of all TIDs to the set of setup links 345-355.

This means a link of the plurality of links 345-355 may be disabled or enabled. An enabled link has a TID that has mapped to at least one link if that link is enabled. If no TIDs are mapped to a link, then that link is disabled. For example, if no TIDs are mapped to link 350, then the link 350 is disabled. At any point in time, a TID shall always be mapped to at least one link that is set up. The TID to link mapping can be updated after multi-link setup through a negotiation, which can be initiated by any MLD (e.g., the AP-MLD1 305 and/or the non-AP MLD3 310).

The initial power state system 300 may enable a link when that link becomes usable to exchange frames subject to STA power states, and when at least one TID is mapped to that link. An initial state is associated to that link once it is enabled. When the link becomes enabled, which may be through classic setup/association, or via setup/association via TID to link mapping update, the initial power state system 300 may transition a link from a disabled state to an enabled state. The inverse may also be true, where a link may be transitioned from a disabled state to an enabled state. When a link is disabled (i.e. not enabled) by an MLD, the frame exchanges are not possible and TID are not mapped to that link.

A third step may include define power states per link. Frame exchange can be performed on each of the enabled links only if the STA is in awake state, and not if it is in doze state. The initial power state system 300 may follow power management protocols to allow state transitions that are controlled by the STA, or negotiated and planned ahead between an AP (e.g., 315-325) and a STA (e.g., 345-355). One such example may include a target wake time (TWT) for instance.

When the second step described above is completed, the non-AP MLD STA (one or more of the STA1 330, STA2 335, and/or STA3 340) and the AP MLD1 305 can operate and exchange frames on each enabled links (e.g., one or more of the links 345, 350, and/or 355) when the respective STA (one or more of the STAs 330-340) is in the awake state.

One or more of the links 345, 350, and/or 355 may be enabled in one of three methods:

In a first method, one or more of the link(s) 345-355 may be enabled through an MLD setup/association phase, which may or may not incorporate signal(s) for link mapping.

In a second method, one or more of the links 345, 350, and/or 355 may be enabled through a TID-link mapping update negotiation, which occurs after multi-link setup.

For both cases, it is advantageous to define an initial power state of the STA of the non-AP MLD3 310, and define which one or more of the respective links 345-355 gets enabled based on corresponding ones of the STAs 330-340 with which those links are intended to operate. As noted above, conventional methods do not provide definitions for initial power states for multi-link devices after the setup/association of those devices.

According to one embodiment, the initial power state system 300 may facilitate implicit rules that determine the initial power state of the respective STA (one or more of the STAs 330-340) of a link that gets enabled (e.g., one or more respective links 345-355), based on the respective link that has been used to enable that respective AP.

In one aspect, when a link becomes enabled for a STA that is part of a non-AP MLD through multi-link setup/association sent on that link, the initial power management mode of the STA, immediately after the signaling exchange, is set to active mode. For example, if the link 345 is enabled for the STA1 330, the initial power management mode of the non-AP STA1 is set to active mode.

In another aspect of the present disclosure, when a link (e.g., the link 355) is enabled for a STA (e.g., the STA3 340) that is part of a non-AP MLD (e.g., the non-AP MLD3 310) through signaling (multi-link setup/association or TID to link mapping update) the initial power state system 300 may send, on another link such as the link 345 or 350, the initial power management mode of the STA 340. The initial power state system 300 may send the initial power management mode of the STA 340 immediately after the exchange, when the link 350 is in a power save mode, and its power state is in a doze state.

In an example embodiment, the initial power state system 300 may setup/associate 2 links (e.g., the links 345 and 350) between the AP MLD1 305 and the non-AP MLD 310, and apply default mapping where all links 345-355 are enabled by the multi-link setup/association phase. The initial power state system 300 may exchange setup frames on the link 345. At the end of multi-link setup, the initial power management mode and state of the STAs (of the non-AP MLD3 310) operating on the links 345 and 350 are as follows:

The STA1 330 operating on the link 345 is in an active mode (awake state); and The STA2 335 operating on the link 350 is in a power save mode (doze state).

In another embodiment, the initial power state system 300 may setup/associate 2 links (e.g., links 345 and 350) between the AP MLD1 305 and the non-AP MLD3 310, but only one link (e.g., the link 345) is enabled. After some time of operating on link 1, the AP MLD1 305 and the non-AP MLD 3 310 STA2 335 may exchange a TID-link mapping update to enable link 2. At the end of the TID-mapping update, the initial power management mode and state of the STA2 335 of the non-AP MLD operating on link 350 is as follows: The STA2 335 operating on link 350 is in power save mode (doze state).

In one or more embodiments, system may facilitate an initial power state that the non-AP MLD 310 can indicate, during the multi-link setup phase and during the TID-link mapping update negotiation, where the initial power management mode and power state of the STA(s) (any of the STAs 330-340) operating on the respective link that will become enabled right after the successful completion of the multi-link setup or TID-link mapping update.

In one embodiment, the initial power state system 300 may enable the link in the MLD link setup request or response sent by the non-AP MLD 310, where the non-AP MLD 310 designates a field (not shown in FIG. 3), for each link that is part of the setup. The field indicates an initial power state for the STA upon successful completion of the multi-link setup/association.

The initial power state system may enable the link in the TID-link mapping update request or response sent by the non-AP MLD, using a field for each link that is part of the TID-mapping update. The field may indicate the initial power state with which the STA intends to operate on upon successful update of TID-link mapping. The field may further indicate whether a link was previously disabled, and has become enabled by the TID-link mapping function.

In another example embodiment, the initial power state system 300 may setup two links (e.g., links 345 and 350) between the AP MLD1 305 and the non-AP MLD 310. The initial power state system 300 may and apply a default mapping, where all links 345-355 are enabled by the MLD setup/association phase. The initial power state system 300 may exchange MLD setup frames on the link 345, and send an MLD setup request frame (or association request frame) by the non-AP MLD 310 to include an initial power state field in the element describing the link power state. In another embodiment, the field may also describe the link 345. In one aspect, the initial power state field of link 1 may include a value indicative that the initial power state of the link 345 is set to "active mode," and the initial power state field of link 3 350 is set to "active mode." At the end of multi-link setup/association, the initial power management mode and state of the STAs (of the non-AP MLD) operating on link 1 and 2 are as follows:

The STA1 330 operating on link 1 345 may be set to an active mode (awake state); and The STA2 335 operating on link 2 350 may be set to the active mode (awake state).

In another example, the links 345 and 350 may be setup by multi-link setup (link 1 and 2) between the AP MLD1 305 and the non-AP MLD 310. The default mapping may be applied where all links 345 and 350 are enabled by the multi-link setup/association phase. Multi-link setup frames are exchanged on link 1 345, and multi-link setup request frame (or association request frame) sent by the non-AP MLD 310 may include an "initial power state" field in the element describing link 1 345 and, in the element, describing link 2 350. The initial power state field of link 1 345 may be set to "active mode", and the initial power state field of link 2 350 may be set to a power save mode doze state. According to the second example embodiment, at the end of multi-link setup/association the initial power management mode and state of the STAs (of the non-AP MLLE) operating on link 1 and 2 are as follows:

The STA1 330 operating on link 1 345 is set to the active mode (awake state); and The STA2 335 operating on link 2 350 is set to the power save mode (doze state).

It is understood that the above descriptions are for purposes of illustration and are not meant to be limiting.

Figure 4:
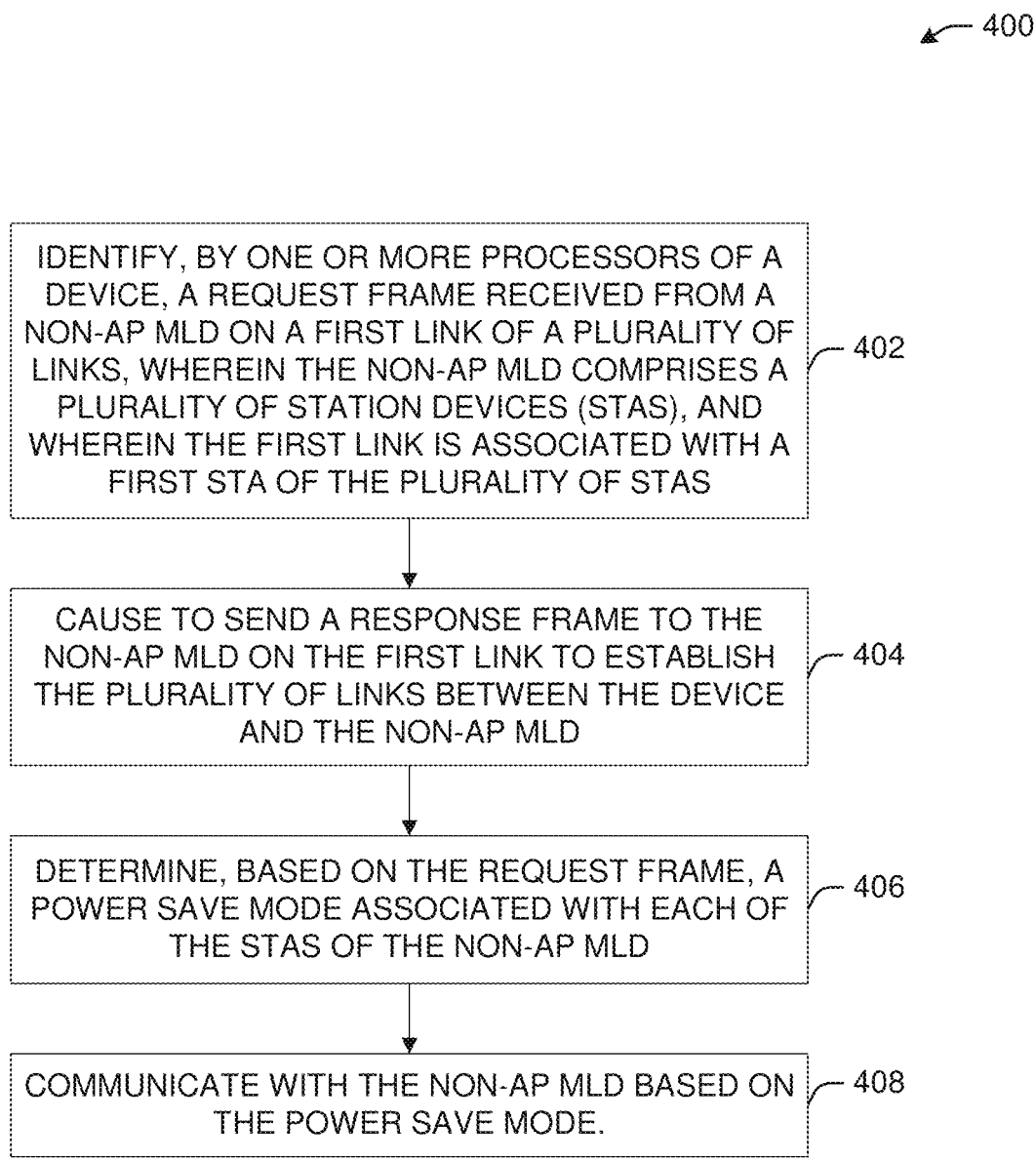
FIG. 4 depicts an example flow diagram of a method in accordance with one or more example embodiments of the present disclosure.

FIG. 4 illustrates a flow diagram of illustrative process 400 for an initial power state system, in accordance with one or more example embodiments of the present disclosure.

At block 402, a device (e.g., the user device(s) 120 and/or the AP 102 of FIG. 1) may identify a request frame received from a non-AP MLD on a first link of a plurality of links, wherein the non-AP MLD comprises a plurality of station devices (STAs), and wherein the first link is associated with a first STA of the plurality of STAs. The device may be an access point (AP) multi-link device (MLD). The request frame received from the non-AP MLD comprises a first field indicative of an initial power state of the first STA.

At block 404, the device may cause to send a response frame to the non-AP MLD on the first link to establish the plurality of links between the device and the non-AP MLD. The device may determine the first link is enabled for the first STA based on receiving the request frame. The device may set up a traffic identifier (TID) associated with data traffic to be exchanged with the non-AP MLD, wherein the setting up of the TID comprises mapping a plurality of TIDs to one or more enabled links of the plurality links. The TID comprises a TID mapping update comprising an indication a change of an initial power state of the first STA.

At block 406, the device may determine, based on the request frame, a power save mode associated with each of the STAs of the non-AP MLD. The power save mode may comprise an active state or a doze state based on a power management bit set 1 in the request frame.

At block 408, the device may communicate with the non-AP MLD based on the power save mode. The device may identify an update request received from the non-AP MLD to update the power save modes of each of the links of the plurality of links.

It is understood that the above descriptions are for purposes of illustration and are not meant to be limiting.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 102 (FIG. 1) or a user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an initial power state device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the initial power state device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The initial power state device 619 may carry out or perform any of the operations and processes (e.g., process 400) described and shown above.

It is understood that the above are only a subset of what the initial power state device 619 may be configured to perform and that other functions included throughout this disclosure may also be performed by the initial power state device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
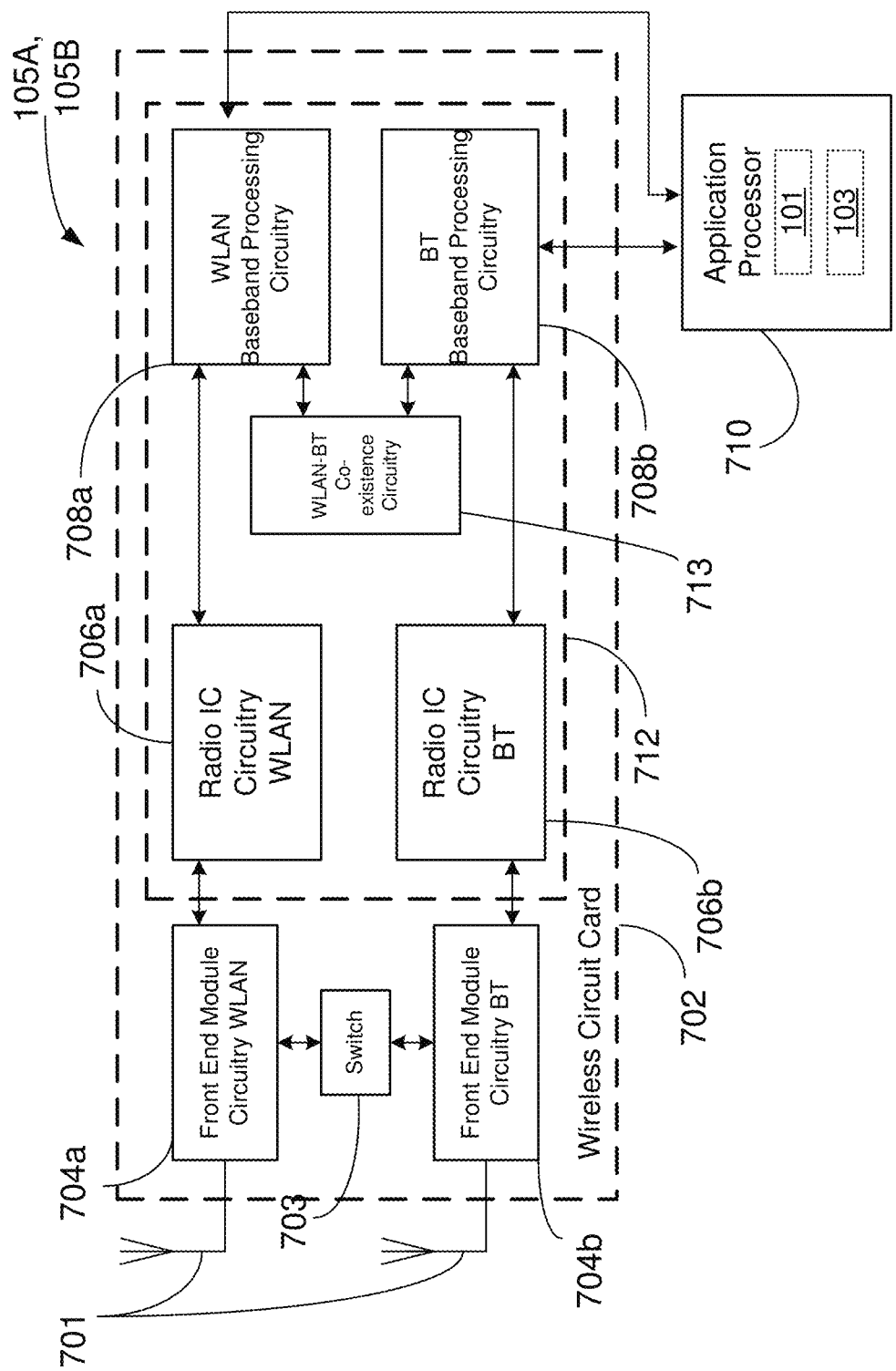
FIG. 7 is a block diagram of a radio architecture in accordance with some examples.

FIG. 7 is a block diagram of a radio architecture 105A, 105B in accordance with some embodiments that may be implemented in any one of the example AP 100 and/or the example STAs 230-240 of FIGS. 2 and/or 330-340 of FIG. 3. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
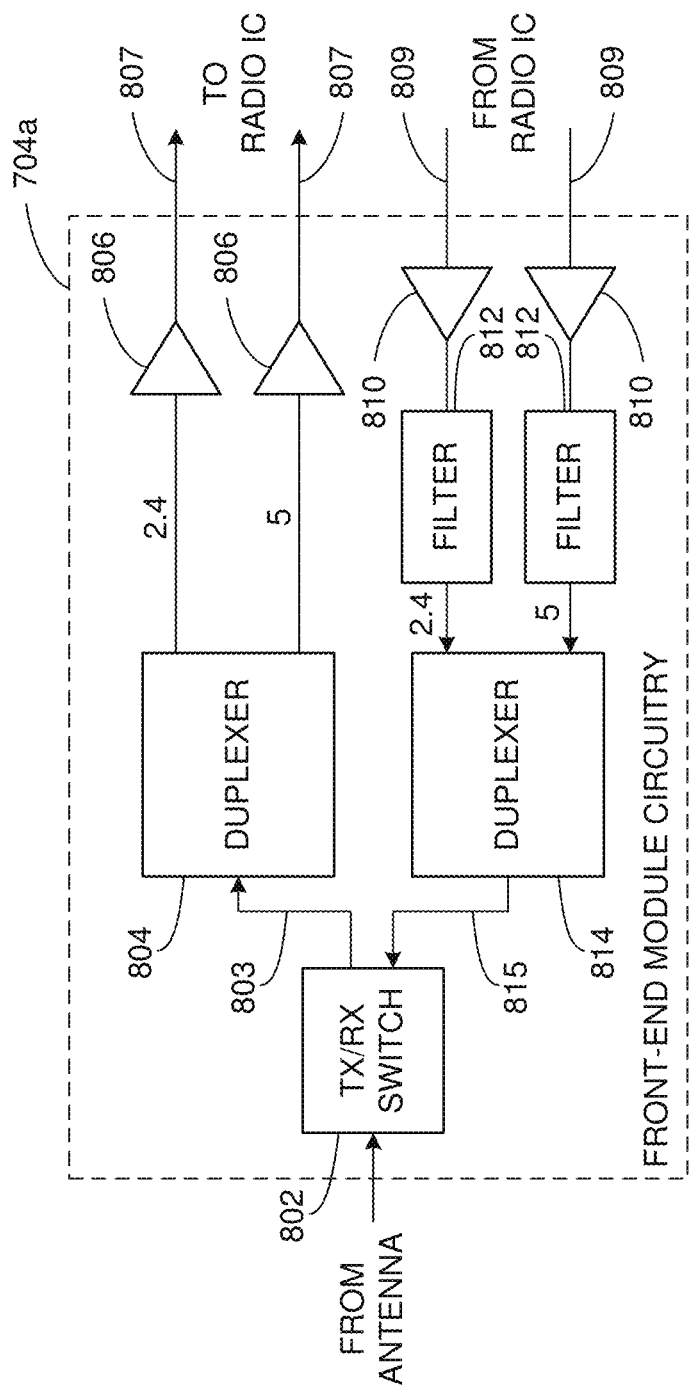
FIG. 8 illustrates an example front-end module circuitry for use in the radio architecture of FIG. 7, in accordance with one or more example embodiments of the present disclosure.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706*a-b* (FIG. 7)). The transmit signal path of the circuitry 704*a* may include a power amplifier (PA) to amplify input RF signals 809 (e.g., provided by the radio IC circuitry 706*a-b*), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704*a* may be configured to operate in either the 2.4 GHz frequency spectrum or the 5 GHz frequency spectrum. In these embodiments, the receive signal path of the FEM circuitry 704*a* may include a receive signal path duplexer 804 to separate the signals from each spectrum as well as provide a separate LNA 806 for each spectrum as shown. In these embodiments, the transmit signal path of the FEM circuitry 704*a* may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704*a* as the one used for WLAN communications.

Figure 9:
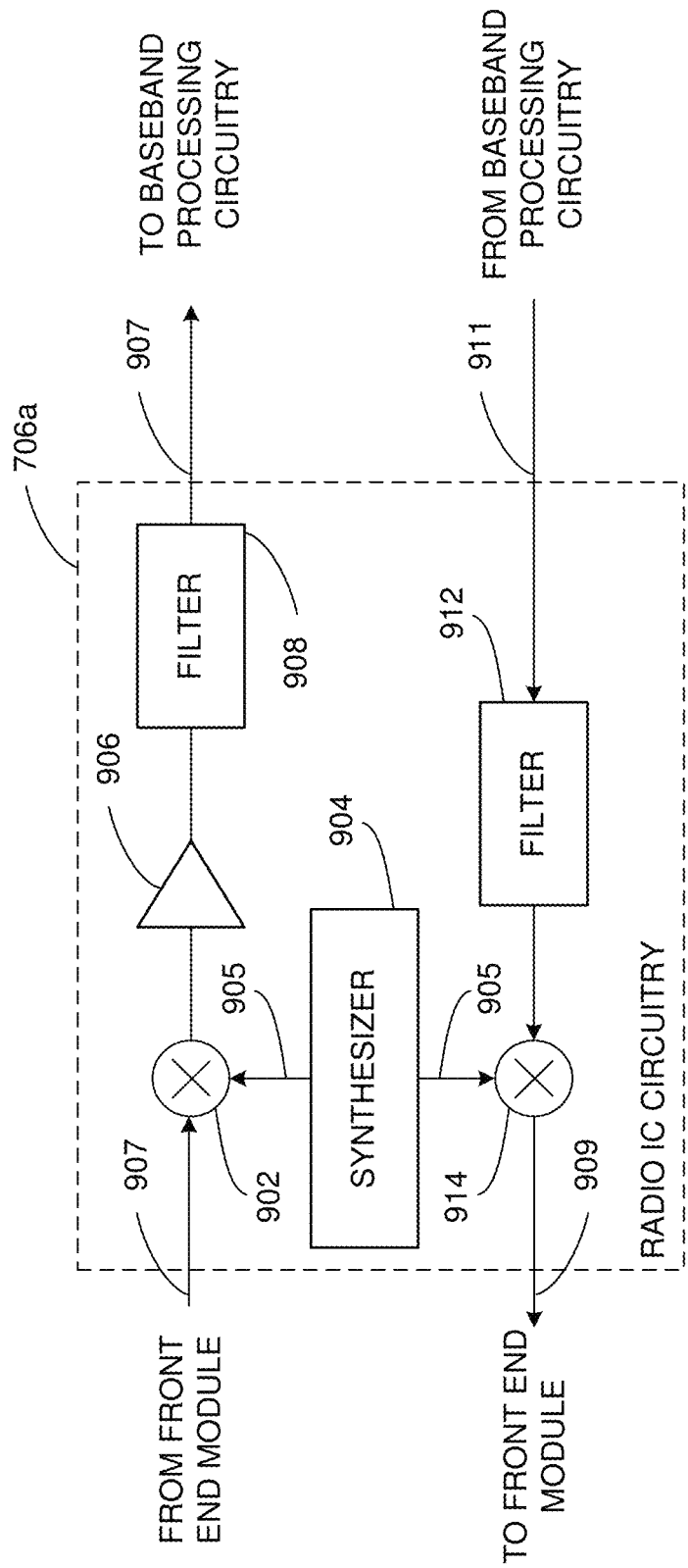
FIG. 9 illustrates an example radio IC circuitry for use in the radio architecture of FIG. 7, in accordance with one or more example embodiments of the present disclosure.

FIG. 9 illustrates radio IC circuitry 706*a* in accordance with some embodiments. The radio IC circuitry 706*a* is one example of circuitry that may be suitable for use as the WLAN or BT radio IC circuitry 706*a*/706*b* (FIG. 7), although other circuitry configurations may also be suitable. Alternatively, the example of FIG. 9 may be described in conjunction with the example BT radio IC circuitry 706*b*.

In some embodiments, the radio IC circuitry 706*a* may include a receive signal path and a transmit signal path. The receive signal path of the radio IC circuitry 706*a* may include at least mixer circuitry 902, such as, for example, down-conversion mixer circuitry, amplifier circuitry 906 and filter circuitry 908. The transmit signal path of the radio IC circuitry 706*a* may include at least filter circuitry 912 and mixer circuitry 914, such as, for example, up-conversion mixer circuitry. Radio IC circuitry 706*a* may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704*a-b* (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708*a-b* (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704*a-b*. The baseband signals 911 may be provided by the baseband processing circuitry 708*a-b* and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
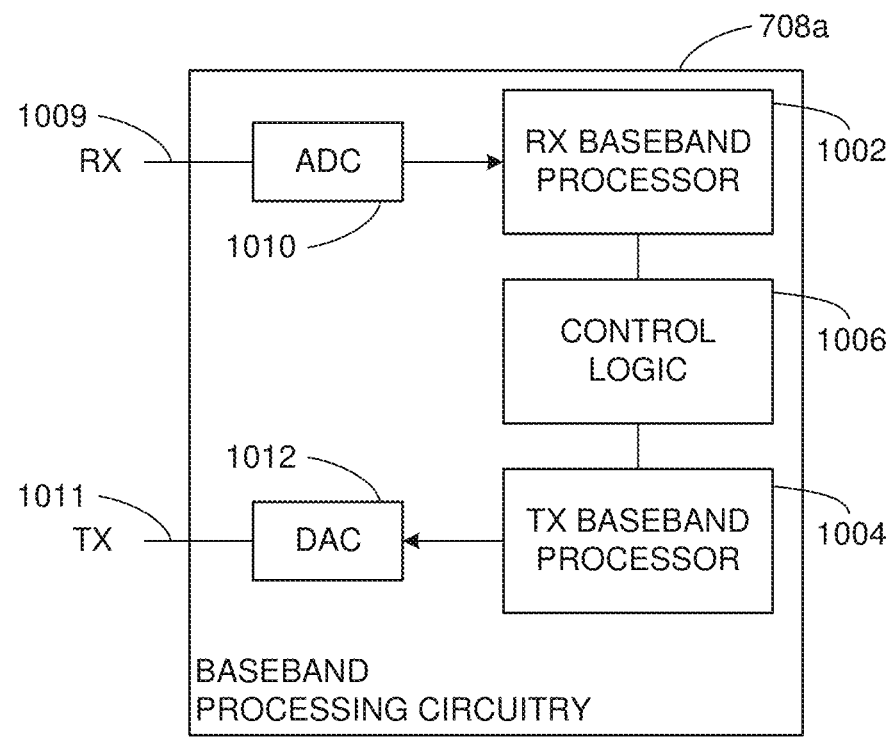
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: identify a request frame received from a non-AP MLD on a first link of a plurality of links, wherein the non-AP MLD comprises a plurality of station devices (STAs), and wherein the first link may be associated with a first STA of the plurality of STAs; cause to send a response frame to the non-AP MLD on the first link to establish the plurality of links between the device and the non-AP MLD; determine, based on the request frame, a power save mode associated with each of the STAs of the non-AP MLD; and communicate with the non-AP MLD based on the power save mode.

Example 2 may include the device of example 1 and/or some other example herein, wherein the power save mode comprises an active state or a doze state based on a power management bit set 1 in the request frame.

Example 3 may include the device of example 1 and/or some other example herein, wherein the device may be an access point (AP) multi-link device (MLD).

Example 4 may include the device of example 1 and/or some other example herein, wherein the processing circuitry may be further configured to determine the first link may be enabled for the first STA based on receiving the request frame.

Example 5 may include the device of example 1 and/or some other example herein, wherein the processing circuitry may be further configured to set up a traffic identifier (TID) associated with data traffic to be exchanged with the non-AP MLD, wherein the setting up of the TID comprises mapping a plurality of TIDs to one or more enabled links of the plurality links.

Example 6 may include the device of example 4 and/or some other example herein, wherein the TID comprises a TID mapping update comprising an indication a change of an initial power state of the first STA.

Example 7 may include the device of example 1 and/or some other example herein, wherein the processing circuitry may be further configured to identify an update request received from the non-AP MLD to update the power save modes of each of the links of the plurality of links.

Example 8 may include the device of example 1 and/or some other example herein, wherein the request frame received from the non-AP MLD comprises a first field indicative of an initial power state of the first STA.

Example 9 may include the device of example 1 and/or some other example herein, further comprising a transceiver configured to transmit and receive wireless signals.

Example 10 may include the device of example 8 and/or some other example herein, further comprising an antenna coupled to the transceiver to cause to send the response frame.

Example 11 may include a non-transitory computer-readable medium storing computer-executable instructions which when executed by one or more processors of a device result in performing operations comprising: identifying a request frame received from a non-AP MLD on a first link of a plurality of links, wherein the non-AP MLD comprises a plurality of station devices (STAs), and wherein the first link may be associated with a first STA of the plurality of STAs; causing to send a response frame to the non-AP MLD on the first link to establish the plurality of links between the AP MLD and the non-AP MLD; determining, based on the request frame, a power save mode associated with each of the STAs of the non-AP MLD; and communicating with the non-AP MLD based on the power save mode.

Example 12 may include the non-transitory computer-readable medium of example 11 and/or some other example herein, wherein the power save mode comprises an active state or a doze state based on a power management bit set 1 in the request frame.

Example 13 may include the non-transitory computer-readable medium of example 10 and/or some other example herein, wherein the device may be an access point (AP) multi-link device (MLD).

Example 14 may include the non-transitory computer-readable medium of example 11 and/or some other example herein, wherein the operations further comprise determining the first link may be enabled for the first STA based on receiving the request frame.

Example 15 may include the non-transitory computer-readable medium of example 11 and/or some other example herein, wherein the operations further comprise setting up a traffic identifier (TID) associated with data traffic to be exchanged with the non-AP MLD, wherein the setting up of the TID comprises mapping a plurality of TIDs to one or more enabled links of the plurality links.

Example 16 may include the non-transitory computer-readable medium of example 14 and/or some other example herein, wherein the TID comprises a TID mapping update comprising an indication a change of an initial power state of the first STA.

Example 17 may include the non-transitory computer-readable medium of example 11 and/or some other example herein, wherein the operations further comprise identifying an update request received from the non-AP MLD to update the power save modes of each of the links of the plurality of links.

Example 18 may include the non-transitory computer-readable medium of example 11 and/or some other example herein, wherein the request frame received from the non-AP MLD comprises a first field indicative of an initial power state of the first STA.

Example 19 may include a method comprising: identifying, by one or more processors of a device, a request frame received from a non-AP MLD on a first link of a plurality of links, wherein the non-AP MLD comprises a plurality of station devices (STAs), and wherein the first link may be associated with a first STA of the plurality of STAs; causing to send a response frame to the non-AP MLD on the first link to establish the plurality of links between the device and the non-AP MLD; determining, based on the request frame, a power save mode associated with each of the STAs of the non-AP MLD; and communicating with the non-AP MLD based on the power save mode.

Example 20 may include the method of example 19 and/or some other example herein, wherein the power save mode comprises an active state or a doze state based on a power management bit set 1 in the request frame.

Example 21 may include the method of example 19 and/or some other example herein, further comprising determining the first link may be enabled for the first STA based on receiving the request frame.

Example 22 may include the method of example 19 and/or some other example herein, further comprising setting up a traffic identifier (TID) associated with data traffic to be exchanged with the non-AP MLD, wherein the setting up of the TID comprises mapping a plurality of TIDs to one or more enabled links of the plurality links.

Example 23 may include the method of example 22 and/or some other example herein, wherein the TID comprises a TID mapping update comprising an indication a change of an initial power state of the first STA.

Example 24 may include the method of example 19 and/or some other example herein, further comprising identifying an update request received from the non-AP MLD to update the power save modes of each of the links of the plurality of links.

Example 25 may include the method of example 19 and/or some other example herein, wherein the request frame received from the non-AP MLD comprises a first field indicative of an initial power state of the first STA.

Example 26 may include an apparatus comprising means for: identifying a request frame received from a non-AP MLD on a first link of a plurality of links, wherein the non-AP MLD comprises a plurality of station devices (STAs), and wherein the first link may be associated with a first STA of the plurality of STAs; causing to send a response frame to the non-AP MLD on the first link to establish the plurality of links between the apparatus and the non-AP MLD; determining, based on the request frame, a power save mode associated with each of the STAs of the non-AP MLD; and communicating with the non-AP MLD based on the power save mode.

Example 27 may include the apparatus of example 26 and/or some other example herein, wherein the power save mode comprises an active state or a doze state based on a power management bit set 1 in the request frame.

Example 28 may include the apparatus of example 26 and/or some other example herein, further comprising determining the first link may be enabled for the first STA based on receiving the request frame.

Example 29 may include the apparatus of example 26 and/or some other example herein, further comprising setting up a traffic identifier (TID) associated with data traffic to be exchanged with the non-AP MLD, wherein the setting up of the TID comprises mapping a plurality of TIDs to one or more enabled links of the plurality links.

Example 30 may include the apparatus of example 29 and/or some other example herein, wherein the TID comprises a TID mapping update comprising an indication a change of an initial power state of the first STA.

Example 31 may include the apparatus of example 26 and/or some other example herein, further comprising identifying an update request received from the non-AP MLD to update the power save modes of each of the links of the plurality of links.

Example 32 may include the apparatus of example 26 and/or some other example herein, wherein the request frame received from the non-AP MLD comprises a first field indicative of an initial power state of the first STA.

Example 33 may include one or more non-transitory computer-readable media comprising instructions to cause an electronic device, upon execution of the instructions by one or more processors of the electronic device, to perform one or more elements of a method described in or related to any of examples 1-32, or any other method or process described herein.

Example 34 may include an apparatus comprising logic, modules, and/or circuitry to perform one or more elements of a method described in or related to any of examples 1-32, or any other method or process described herein.

Example 35 may include a method, technique, or process as described in or related to any of examples 1-32, or portions or parts thereof.

Example 36 may include an apparatus comprising: one or more processors and one or more computer readable media comprising instructions that, when executed by the one or more processors, cause the one or more processors to perform the method, techniques, or process as described in or related to any of examples 1-32, or portions thereof.

Example 37 may include a method of communicating in a wireless network as shown and described herein.

Example 38 may include a system for providing wireless communication as shown and described herein.

Example 39 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:

detect a link enablement event of one or more links for a first station (STA) affiliated with a non-access point (AP) multi-link device (MLD) comprising a plurality of STAs after a successful MLD association; determine the link enablement event is associated with association request or response frames transmitted on a link of the one or more links; monitor the acknowledgement of the association response frame response frame for the first STA; set a power management mode of the first STA and the remaining STAs of the plurality of STAs based on link enablement events; set a power state of the first STA and the remaining STAs of the plurality of STAs based on the power management mode; set an initial power state of the first STA to an active mode upon enablement of a link through MLD setup or association; and maintain and update the power state of the first STA based on transition events.

2. The device of claim 1, wherein the processing circuitry is further configured to set the power management mode of the first STA to active mode if a link enablement event is associated with Association Request/Response frames transmitted on the same link.

3. The device of claim 1, wherein the processing circuitry is further configured to set the power management mode of the first STA to power save mode if a link enablement event is associated with Association Request/Response frames transmitted on another link or after successful traffic identifier (TID)-to-link mapping negotiation with TID-To-Link Mapping Request/Response frames transmitted on another link.

4. The device of claim 1, wherein the processing circuitry is further configured to set the power state of the first STA to doze if the power management mode of the first STA is power save mode.

5. The device of claim 1, wherein the power management mode comprises an active state or a doze state.

6. The device of claim 1, wherein the device is an access point (AP) multi-link device (MLD).

7. The device of claim 1, wherein the processing circuitry is further configured to determine the first link is enabled for the first STA based on receiving the request frame.

8. The device of claim 1, wherein the processing circuitry is further configured to set up a traffic identifier (TID) associated with data traffic to be exchanged with the non-AP MLD, wherein the setting up of the TID comprises mapping a plurality of TIDs to one or more enabled links of the plurality links.

9. The device of claim 8, wherein the TID comprises a TID mapping update comprising an indication of a change of an initial power state of the first STA.

10. A non-transitory computer-readable medium storing computer-executable instructions which when executed by one or more processors result in performing operations comprising: detecting a link enablement event of one or more links for a first station (STA) affiliated with a non-access point (AP) multi-link device (MLD) comprising a plurality of STAs after a successful MLD association; determining the link enablement event is associated with association request or response frames transmitted on a link of the one or more links; monitor the acknowledgement of the association response frame response frame for the first STA; setting a power management mode of the first STA and the remaining STAs of the plurality of STAs based on link enablement events; setting a power state of the first STA and the remaining STAs of the plurality of STAs based on the power management mode; setting an initial power state of the first STA to an active mode upon enablement of a link through MLD setup and association; and maintaining and updating the power state of the first STA based on transition events.

11. The non-transitory computer-readable medium of claim 10, wherein the operations further comprise setting the power management mode of the first STA to active mode if a link enablement event is associated with Association Request/Response frames transmitted on the same link.

12. The non-transitory computer-readable medium of claim 10, wherein the operations further comprise setting the power management mode of the first STA to power save mode if a link enablement event is associated with Association Request/Response frames transmitted on another link or after successful traffic identifier (TID)-to-link mapping negotiation with TID-To-Link Mapping Request/Response frames transmitted on another link.

13. The non-transitory computer-readable medium of claim 10, wherein the operations further comprise setting the power state of the first STA to doze if the power management mode of the first STA is the power save mode.

14. The non-transitory computer-readable medium of claim 10, wherein the power management mode comprises an active state or a doze state.

15. The non-transitory computer-readable medium of claim 10, wherein the device is an access point (AP) multi-link device (MLD).

16. The non-transitory computer-readable medium of claim 10, wherein the operations further comprise determining the first link is enabled for the first STA based on receiving the request frame.

17. The non-transitory computer-readable medium of claim 10, wherein the operations further comprise setting up a traffic identifier (TID) associated with data traffic to be exchanged with the non-AP MLD, wherein the setting up of the TID comprises mapping a plurality of TIDs to one or more enabled links of the plurality links.

18. The non-transitory computer-readable medium of claim 17, wherein the TID comprises a TID mapping update comprising an indication change of an initial power state of the first STA.

19. A method comprising: detecting, by one or more processors, a link enablement event of one or more links for a first station (STA) affiliated with a non-access point (AP) multi-link device (MLD) comprising a plurality of STAs after a successful MLD association; determining the link enablement event is associated with association request or response frames transmitted on a link of the one or more links; monitor the acknowledgement of the association response frame response frame for the first STA; setting a power management mode of the first STA and the remaining STAs of the plurality of STAs based on link enablement events; setting a power state of the first STA and the remaining STAs of the plurality of STAs based on the power management mode; setting an initial power state of the first STA to an active mode upon enablement of a link through MLD setup or association; and maintaining and updating the power state of the first STA based on transition events.

20. The method of claim 19, further comprising setting the power management mode of the first STA to active mode if a link enablement event is associated with Association Request/Response frames transmitted on the same link.

* * * * *